United States Patent
Duan et al.

(10) Patent No.: US 8,560,908 B2
(45) Date of Patent: Oct. 15, 2013

(54) METHODS AND SYSTEMS FOR ARQ FEEDBACK MESSAGE IMPROVEMENT

(75) Inventors: Quanzhu Duan, San Diego, CA (US); Chun Woo Lee, San Diego, CA (US); Jong Ro Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 12/610,292

(22) Filed: Oct. 31, 2009

(65) Prior Publication Data

US 2010/0146359 A1    Jun. 10, 2010

Related U.S. Application Data

(60) Provisional application No. 61/112,147, filed on Nov. 6, 2008.

(51) Int. Cl.
*G08C 25/02* (2006.01)

(52) U.S. Cl.
USPC ........................................... 714/748; 714/750

(58) Field of Classification Search
USPC .................................. 714/750, 748
See application file for complete search history.

(56) References Cited

U.S. PATENT DOCUMENTS

| | | | |
|---|---|---|---|
| 6,697,331 B1 * | 2/2004 | Riihinen et al. | 370/236 |
| 6,778,501 B1 * | 8/2004 | Malmgren et al. | 370/236 |
| 6,975,647 B2 * | 12/2005 | Neale et al. | 370/466 |
| 7,457,305 B2 * | 11/2008 | Koponen et al. | 370/428 |
| 7,752,519 B2 * | 7/2010 | Yeo et al. | 714/748 |
| 2007/0277073 A1 | 11/2007 | Zegers et al. | |
| 2009/0094498 A1 * | 4/2009 | Kim et al. | 714/750 |
| 2009/0150737 A1 * | 6/2009 | Wang et al. | 714/748 |
| 2010/0050041 A1 * | 2/2010 | Chang et al. | 714/750 |

FOREIGN PATENT DOCUMENTS

| | | |
|---|---|---|
| JP | 2002247139 A | 8/2002 |
| WO | 03005644 A1 | 1/2003 |
| WO | 2005064839 | 7/2005 |

OTHER PUBLICATIONS

"802.16-2004, Part 16: Air Interface for Fixed Broadband Wireless Access Systems" IEEE Standard for Local and Metropolitan Area Networks; IEEE, US, No. Part. 16, Jan. 1, 2004, pp. 128-138, XP002491119.
International Search Report & Written Opinion—PCT/US2009/063184, International Search Authority—European Patent Office—Apr. 21, 2010.

* cited by examiner

*Primary Examiner* — Philip Guyton
(74) *Attorney, Agent, or Firm* — Tyler J. Overall

(57) ABSTRACT

Certain embodiments of the present disclosure propose techniques for improving automatic repeat request (ARQ) feedback messages to reduce unnecessary transmissions by notifying the transmitter of the last acknowledged block in the ARQ feedback message.

32 Claims, 13 Drawing Sheets

Feedback message types:
(1) Cumulative
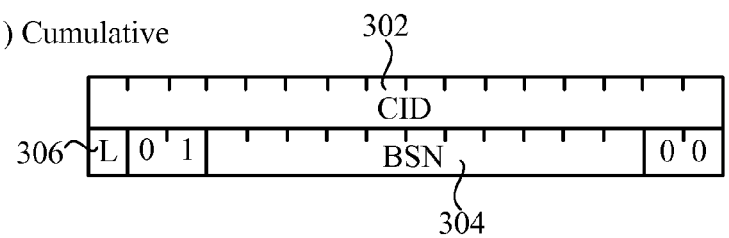
L: Last bit
N: Number of ACK Map-1
X: 0 or 1
(2) Selective
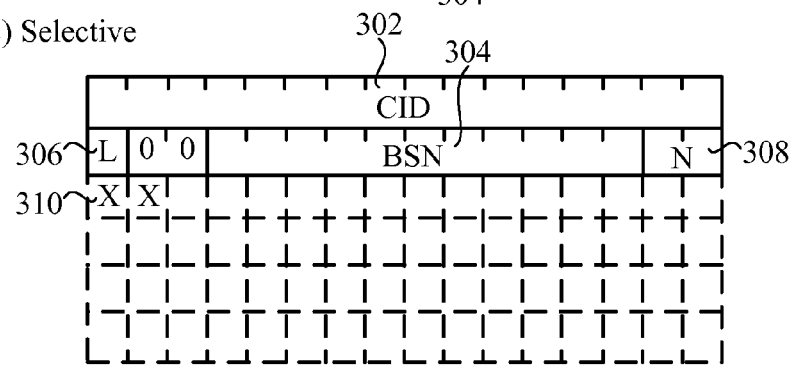
(3) Cumulative with Selective
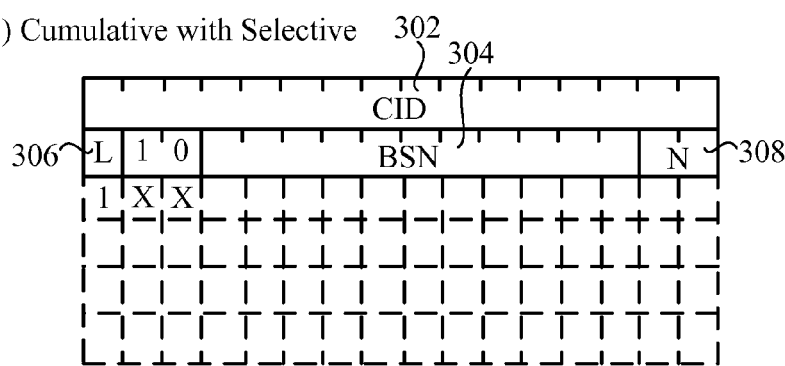
(4) Cumulative with Block Sequence
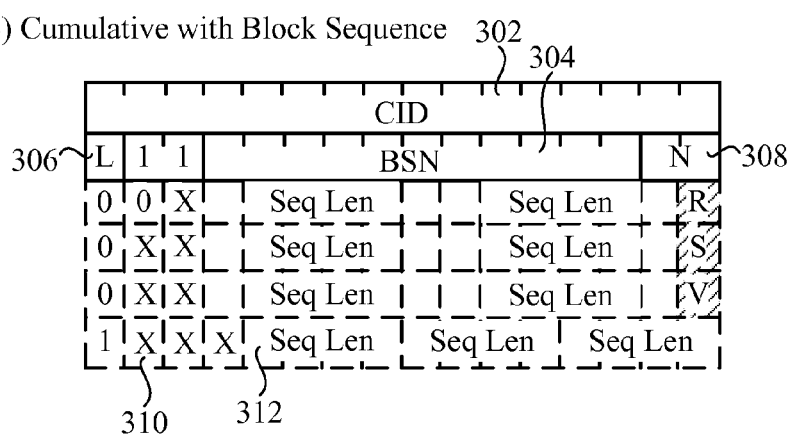
FIG. 3

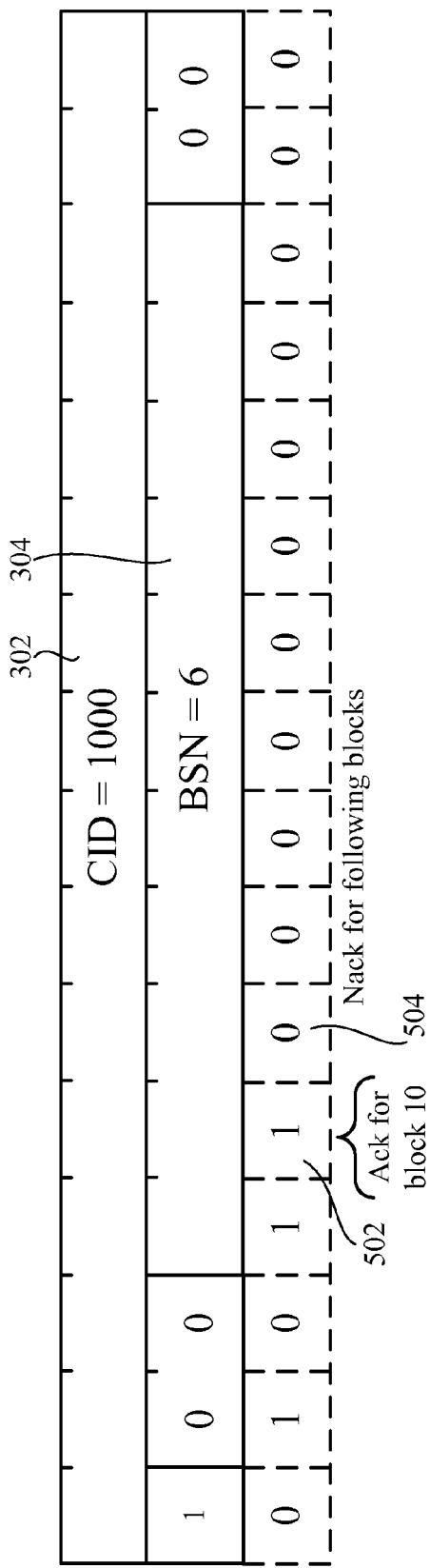

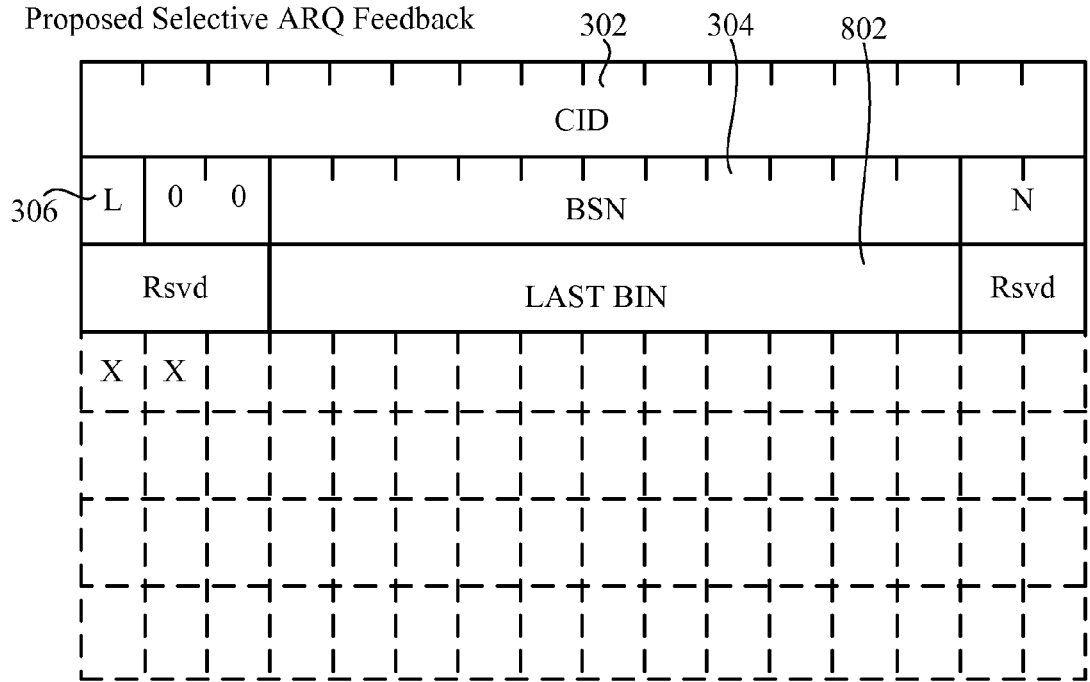
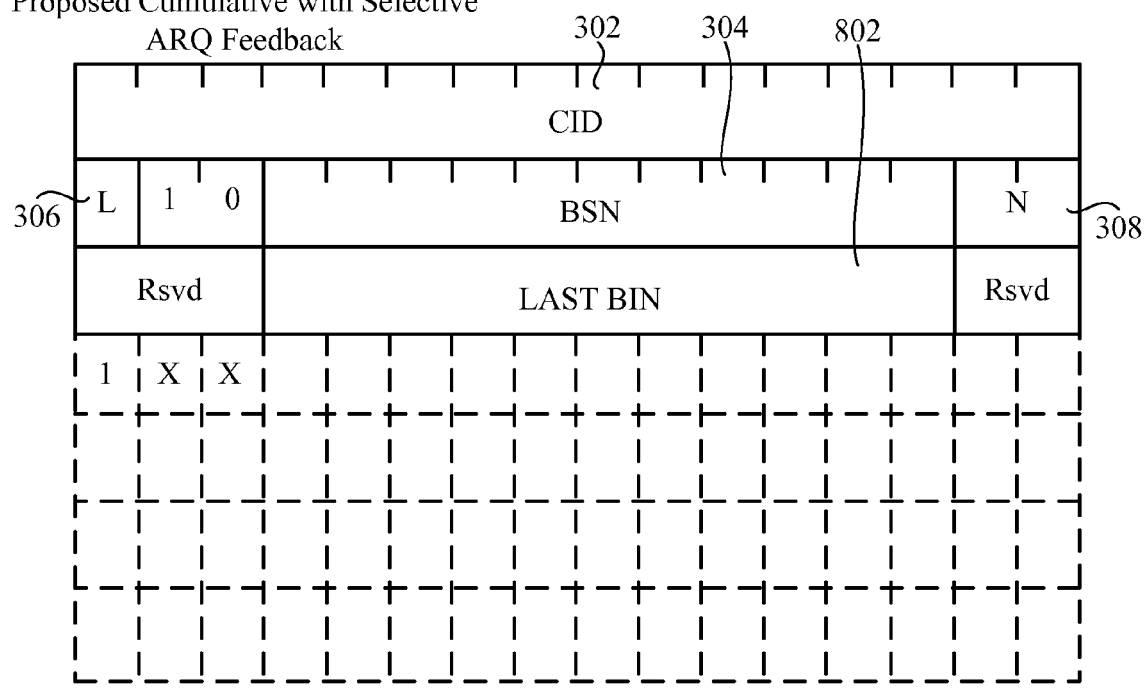
FIG. 8

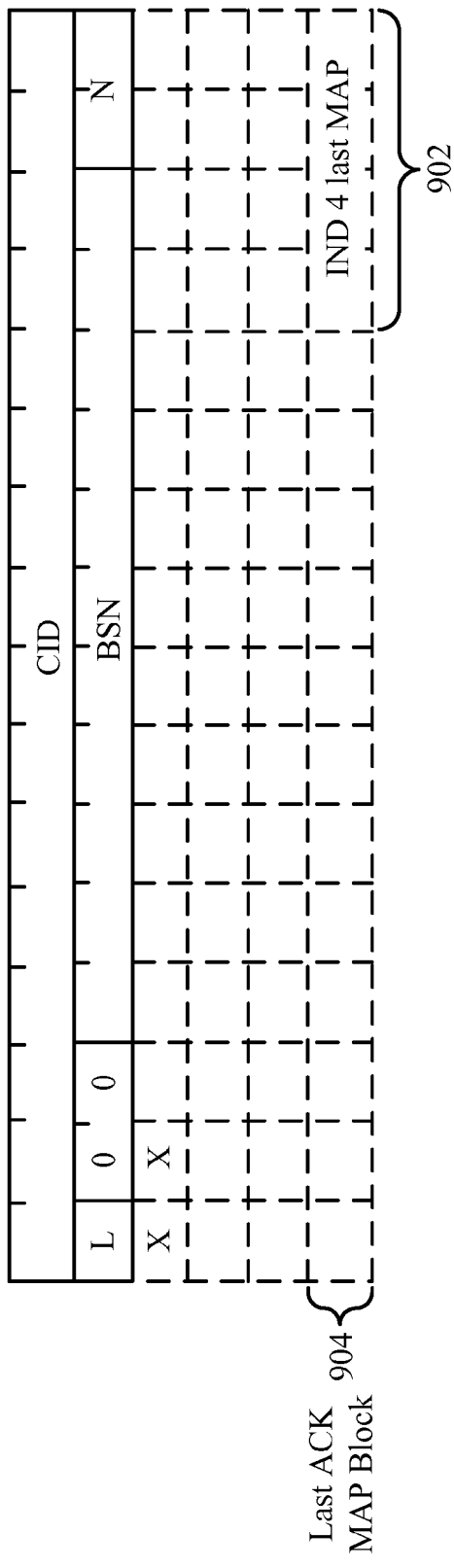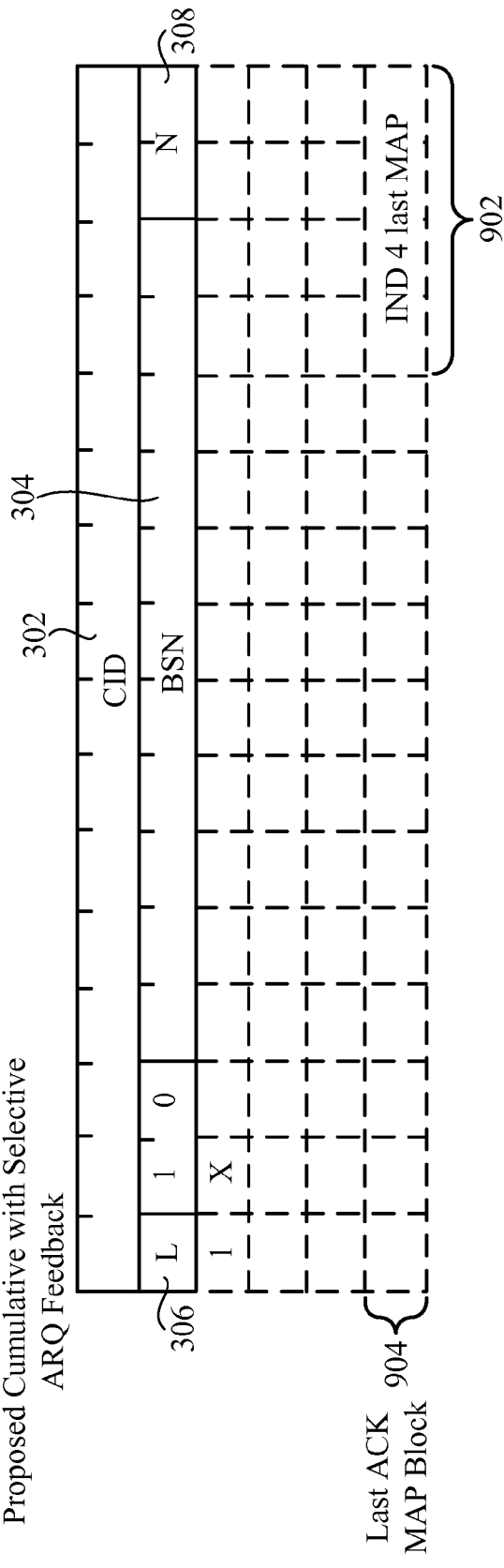
FIG. 9

Proposed Selective ARQ Feedback

Proposed Selective ARQ Feedback

Proposed Cumulative with Selective ARQ Feedback

Proposed Cumulative with Selective ARQ Feedback

METHODS AND SYSTEMS FOR ARQ FEEDBACK MESSAGE IMPROVEMENT

CLAIM OF PRIORITY

This patent application claims the benefit of priority from U.S. Provisional Patent Application Ser. No. 61/112,147, entitled "Improvement of ARQ Feedback Message" and filed Nov. 6, 2008, which is assigned to the assignee of this application and is fully incorporated herein by reference for all purposes.

TECHNICAL FIELD

The present disclosure generally relates to wireless communications, and more specifically, to improving automatic repeat request (ARQ) feedback messages to reduce unnecessary retransmissions.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output, multiple-input-single-output or a multiple-input-multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

SUMMARY

Certain embodiments of the present disclosure provide a method for wireless communications. The method generally includes receiving an Automatic Repeat-Request (ARQ) feedback message, determining a last block acknowledged based on the ARQ feedback message, and ignoring one or more bits in the ARQ feedback message after the last block acknowledged.

Certain embodiments of the present disclosure provide a method for wireless communications. The method generally includes receiving an Automatic Repeat-Request (ARQ) block, generating an ARQ feedback message including an indication of a last block acknowledged from the ARQ block, and transmitting the ARQ feedback message.

Certain embodiments of the present disclosure provide an apparatus for wireless communications. The apparatus generally includes logic for receiving an Automatic Repeat-Request (ARQ) feedback message, logic for determining a last block acknowledged based on the ARQ feedback message, and logic for ignoring one or more bits in the ARQ feedback message after the last block acknowledged.

Certain embodiments of the present disclosure provide an apparatus for wireless communications. The apparatus generally includes logic for receiving an Automatic Repeat-Request (ARQ) block, logic for generating an ARQ feedback message including an indication of a last block acknowledged from the ARQ block, and logic for transmitting the ARQ feedback message.

Certain embodiments of the present disclosure provide an apparatus for wireless communications. The apparatus generally includes means for receiving an Automatic Repeat-Request (ARQ) feedback message, means for determining a last block acknowledged based on the ARQ feedback message, and means for ignoring one or more bits in the ARQ feedback message after the last block acknowledged.

Certain embodiments of the present disclosure provide an apparatus for wireless communications. The apparatus generally includes means for receiving an Automatic Repeat-Request (ARQ) block, means for generating an ARQ feedback message including an indication of a last block acknowledged from the ARQ block, and means for transmitting the ARQ feedback message.

Certain embodiments of the present disclosure provide a computer-program storage apparatus for wireless communications, comprising a computer readable medium having instructions stored thereon, the instructions being executable by one or more processors. The instructions generally include instructions for receiving an Automatic Repeat-Request (ARQ) feedback message, instructions for determining a last block acknowledged based on the ARQ feedback message, and instructions for ignoring one or more bits in the ARQ feedback message after the last block acknowledged.

Certain embodiments of the present disclosure provide a computer-program storage apparatus for wireless communications, comprising a computer readable medium having instructions stored thereon, the instructions being executable by one or more processors. The instructions generally include instructions for receiving an Automatic Repeat-Request (ARQ) block, instructions for generating an ARQ feedback message including an indication of a last block acknowledged from the ARQ block, and instructions for transmitting the ARQ feedback message.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 3 illustrates automatic repeat request (ARQ) feedback message types according to the mobile Worldwide Interoperability for Microwave Access (WiMAX) standard;

FIG. 4 illustrates an exemplary send/receive timeline for an ARQ feedback message.

FIG. 5 illustrates an exemplary feedback bitmap for a selective ARQ feedback for the example in FIG. 4;

FIG. 8 illustrates a first set of proposed bitmaps for selective ARQ feedback and cumulative with selective ARQ feedback messages, in accordance with certain embodiments as set forth herein;

FIG. 9 illustrates a second set of proposed bitmaps for selective ARQ feedback and cumulative with selective ARQ feedback messages, in accordance with certain embodiments as set forth herein;

DETAILED DESCRIPTION

Figure 1:
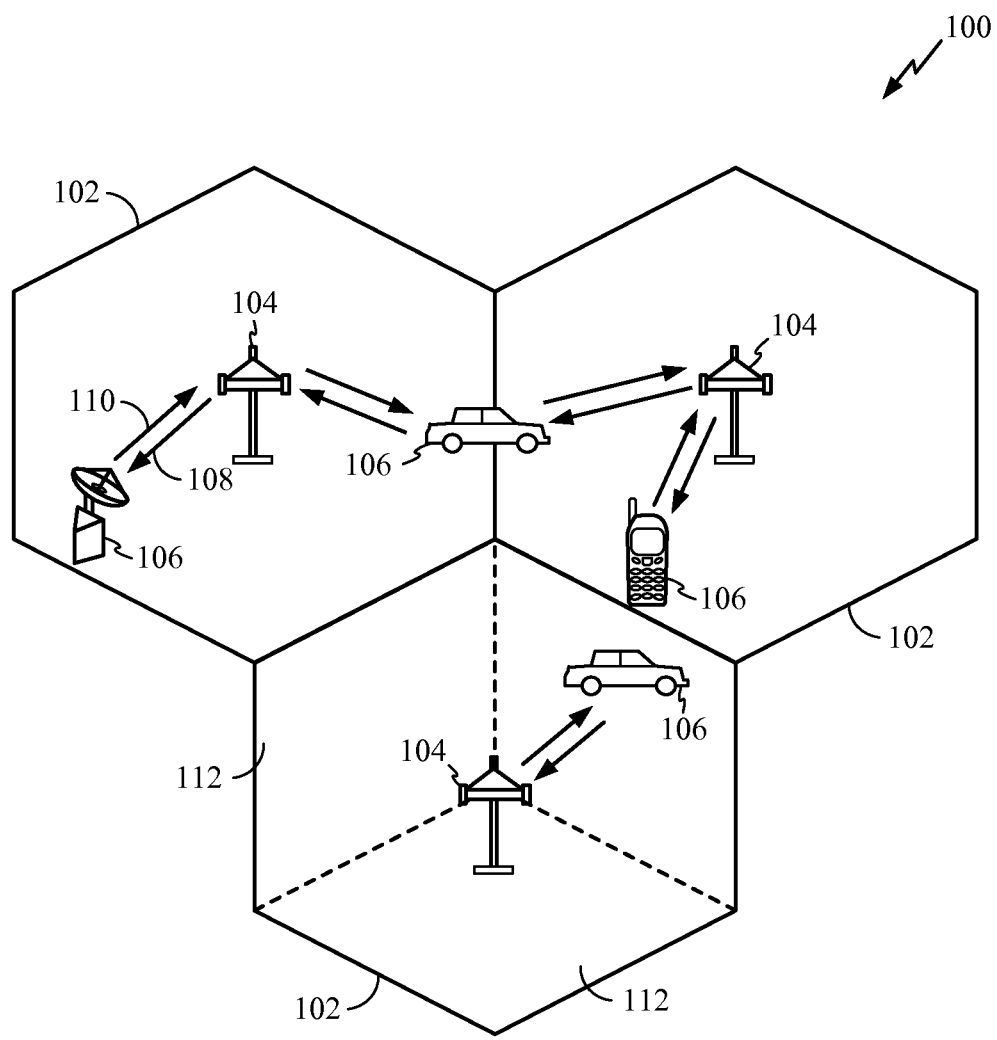
FIG. 1 illustrates an exemplary wireless communication system in accordance with certain embodiments set forth herein.

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiment(s) can be practiced without these specific details. In other instances, well-known structures and devices are shown in block diagram form in order to facilitate describing certain embodiments.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an exemplary wireless communication system 100 in accordance with certain embodiments set forth herein. Wireless communication system 100 may be a broadband wireless communication system. The term "broadband wireless" refers to technology that at least provides wireless, audio, video, voice, Internet, and/or data network access. Wireless communication system 100 provides communication for one or more cells 102, each of which is serviced by a base station 104. Base station 104 may be a fixed station that communicates with user terminals 106 within cell 102 serviced by that base station 104. Base station 104 may alternatively be referred to as an access point, Node B or some other terminology.

As shown in FIG. 1, various user terminals 106 dispersed throughout wireless communication system 100. User terminals 106 may be fixed (i.e., stationary), mobile or capable of both. User terminals 106 may alternatively be referred to as remote stations, access terminals, terminals, subscriber units, mobile stations, stations, user equipment and the like. User terminals 106 may be personal wireless devices, such as cellular phones, personal digital assistants (PDAs), handheld devices, wireless modems, audio/video players, laptop computers, personal computers, other handheld communication devices, other handheld computing devices, satellite radios, global positioning systems, and so on. A variety of algorithms and methods may be used for transmissions in wireless communication system 100 between base stations 104 and user terminals 106. For example, signals may be sent and received between base stations 104 and user terminals 106 in accordance with OFDM/OFDMA techniques. If this is the case, wireless communication system 100 may be referred to as an OFDM/OFDMA system 100.

A communication link that facilitates transmission from base station 104 to user terminal 106 may be referred to as a downlink 108, and a communication link that facilitates transmission from user terminal 106 to base station 104 may be referred to as an uplink 110. Alternatively, downlink 108 may be referred to as a forward link or a forward channel, and uplink 110 may be referred to as a reverse link or a reverse channel. Cell 102 may be divided into multiple sectors 112. Sector 112 is a physical coverage area within cell 102. Base stations 104 within an OFDM/OFDMA system 100 may utilize antennas that concentrate the flow of power within a particular sector 112 of the cell 102. Such antennas may be referred to as directional antennas.

In certain embodiments, system 100 can be a multiple-input multiple-output (MIMO) communication system. Further, system 100 can utilize substantially any type of duplex technique to divide communication channels (e.g., forward link 108, reverse link 110, etc.) such as FDD, TDD, and the like. The channels can be provided for transmitting control data between mobile devices 106 and respective base stations 104.

Figure 2:
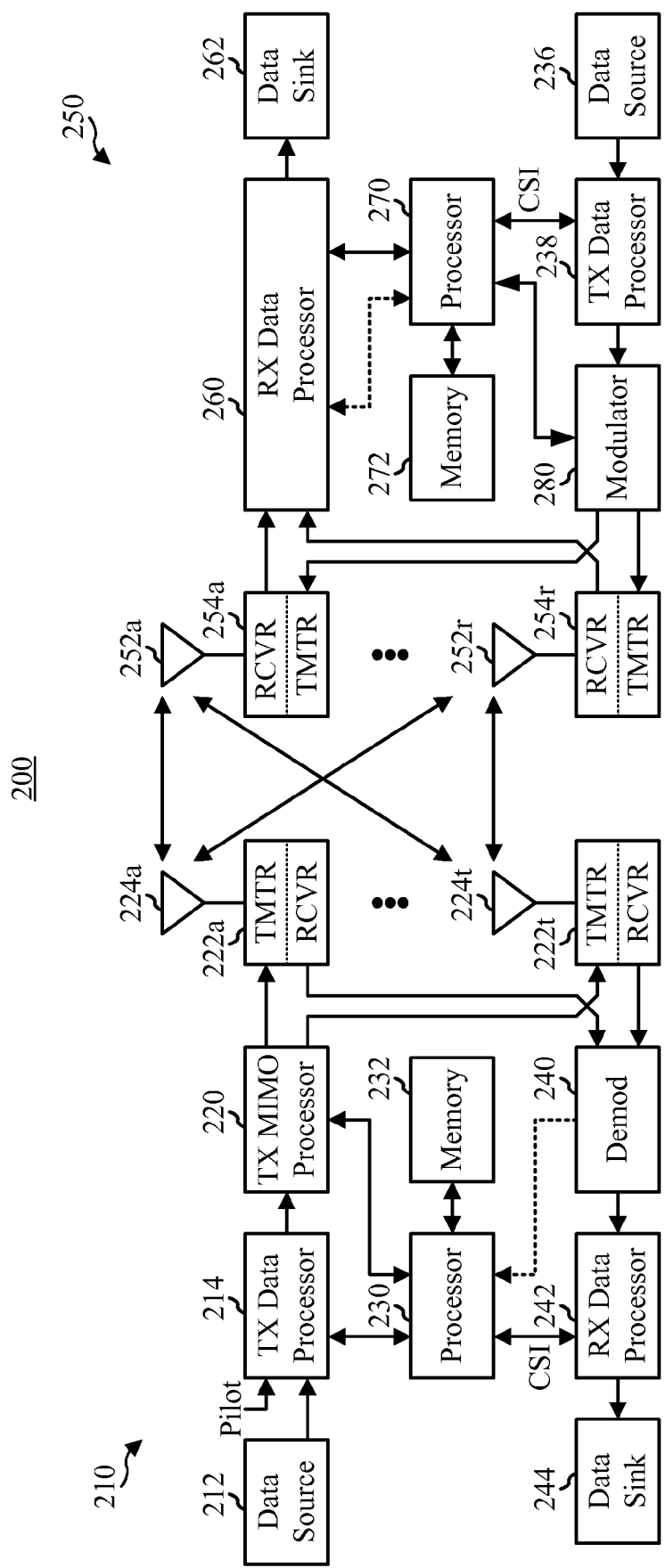
FIG. 2 illustrates a block diagram of a communication system in accordance with certain embodiments set forth herein.

FIG. 2 illustrates an exemplary wireless network environment 200 in accordance with certain embodiments set forth herein. Wireless network environment 200 depicts one base station 210 and one mobile device 250 for sake of brevity. However, it is contemplated that system 200 can include one or more base stations and/or one or more mobile devices, wherein additional base stations and/or mobile devices can be substantially similar or different from illustrated base station 210 and illustrated mobile device 250 described herein. In addition, it is contemplated that base station 210 and/or mobile device 250 can employ the systems, techniques, configurations, embodiments, aspects, and/or methods described herein to facilitate wireless communication between them.

At base station 210, traffic data for a number of data streams is provided from a data source 212 to a transmit (TX) data processor 214. In certain embodiments, each data stream can be transmitted over a respective antenna and/or over multiple antennas. TX data processor 214 formats, codes, and interleaves the traffic data stream based on a particular coding scheme selected for that data stream to provide coded data.

The coded data for each data stream can, for example, be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 250 to estimate channel response or other communication parameters and/or characteristics. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides Nt modulation symbol streams to Nt transmitters (TMTR) 222a through 222t. In certain embodiments, TX MIMO processor 220 applies certain multi-antenna techniques, such spatial multiplexing, diversity coding or precoding (i.e., beamforming, with weights being applied to the modulation symbols of the data streams and to the antenna from which the symbol is being transmitted).

Each transmitter 222 receives and processes a respective modulation symbol stream to provide one or more analog signals, and further conditions (e.g., amplifies, filters, upconverts, etc.) the analog signals to provide a modulated signal suitable for transmission over the MIMO channel. Further, Nt modulated signals from transmitters 222a through 222t are transmitted from Nt antennas 224a through 224t, respectively.

At mobile device 250, the transmitted modulated signals are received by Nr antennas 252a through 252r and the received signal from each antenna 252 is provided to a respective receiver (RCVR) 254a through 254r. Each receiver 254 conditions (e.g., filters, amplifies, downconverts, etc.) a respective signal, digitizes the conditioned signal to provide samples, and further processes the samples to provide a corresponding "received" symbol stream.

A receive (RX) data processor 260 can receive and process the Nr received symbol streams from Nr receivers 254 based on a particular receiver processing technique to provide Nt "detected" symbol streams. RX data processor 260 can demodulate, deinterleave, and decode each detected symbol stream to recover the traffic data for the data stream, and provide the traffic data to a data sink 262. In certain embodiments, for mobile device 250, the processing by RX data processor 260 can be complementary to that performed by TX MIMO processor 220 and TX data processor 214 at base station 210.

A processor 270 can periodically determine which precoding matrix to utilize as discussed above. Further, processor 270 can formulate a reverse link message comprising a matrix index portion and a rank value portion. The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from mobile device 250 are received by Nt antennas 224, conditioned by respective Nt receivers 222, demodulated by a demodulator 240, and processed by a RX data processor 242 to extract the reverse link message transmitted by mobile device 250, and provide the reverse link message to a data sink 244. Further, processor 230 can process the extracted message to determine which precoding matrix to use for determining the beamforming weights.

Processors 230 and 270 can direct (e.g., control, coordinate, manage, etc.) operation at base station 210 and mobile device 250, respectively. Respective processors 230 and 270 can be associated with memory 232 and 272 that store program codes and data. Processors 230 and 270 can also perform computations to derive frequency and impulse response estimates for the uplink and downlink, respectively. All "processor" functions can be migrated between and among process modules such that certain processor modules may not be present in certain embodiments, or additional processor modules not illustrated herein may be present.

Memory 232 and 272 (as with all data stores disclosed herein) can be either volatile memory or nonvolatile memory or can include both volatile and nonvolatile portions, and can be fixed, removable or include both fixed and removable portions. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink™ DRAM (SLDRAM), and direct Rambus™ RAM (DRRAM).

Exemplary Improvement of ARQ Feedback Messages

Certain embodiments of the present disclosure propose methods for improving automatic repeat request (ARQ) feedback messages. The methods include notifying the ARQ transmitter of the last block acknowledged in a ARQ feedback message to avoid unnecessary retransmissions.

In the Mobile WiMAX standards four types of ARQ feedback messages are defined, such as type one (00): Selective acknowledgement (ACK), type two (01): Cumulative ACK, type three (10): Cumulative with Selective ACK, and type four (11): Cumulative ACK with Block Sequence ACK.

FIG. 3 illustrates ARQ feedback message types according to the mobile WiMAX standard. In this figure, bitmaps are shown for the four ARQ feedback message types. CID 302 is a 16-bit connection identification, BSN 304 is the block serial number, L 306 shows the last bit, N 308 shows number of ACK MAP information elements (IEs) minus one, X 310 is a bit with a value of either zero or one, and Seq Len 312 shows the sequence length.

Generally, an ARQ receiver utilizing the Selective ACK or the Cumulative with Selective ACK feedback message types should prepare bitmaps with blocks in multiples of 16. A problem may arise if the ARQ receiver needs to provide ARQ feedback showing ACK for blocks totaling a number different from a multiple of 16. For example, the receiver may want to send ACK messages for 9 blocks. Therefore, the ARQ receiver has to prepare the ARQ feedback with the bits corresponding to the additional blocks set as NACK to bring the total number of bits in a feedback block to a multiple of 16. For example, the ARQ receiver may need to add 16−9=7 zeros (e.g., NACK) to the ARQ feedback message to generate a 16-bit ARQ feedback message. Therefore, the ARQ receiver may generate more NACKs than necessary, which may result in unnecessary retransmissions by the ARQ transmitter.

FIG. 4 illustrates an example send/receive timeline for an ARQ feedback message. In the first frame 402 (e.g., frame 1), the ARQ receiver receives an ARQ block (e.g., block 10). The ARQ receiver prepares a selective feedback message (e.g., feedback message 1). In the second frame 404 (e.g., frame 2), the ARQ receiver receives a second ARQ block (e.g., block 11), in addition, the ARQ receiver receives bandwidth to send the feedback message for the previous block (e.g., feedback message 1) in the third frame 406 (e.g., frame 3).

FIG. 5 illustrates an example selective feedback message for the first frame 402 in FIG. 4. The feedback message 1 includes an ACK bit 502 for the first frame (block 10) and NACK bits for frames after the first frame, including the block 11 received in the second frame.

In the third frame 406 (e.g., frame 3 in FIG. 4), the ARQ transmitter receives the selective feedback message 1, which shows a NACK bit 504 for the block 11 (as illustrated in FIG. 5). In response to the NACK message for the block 11, the ARQ transmitter resends the block 11, which may not be necessary, since it was just sent in the previous frame and might have been received correctly.

Certain embodiments of the present disclosure propose methods for reducing unnecessary negative acknowledgement which result in unnecessary retransmissions of the blocks by an ARQ transmitter, by notifying the transmitter of the last acknowledged bit in the ARQ feedback message.

Figure 6:
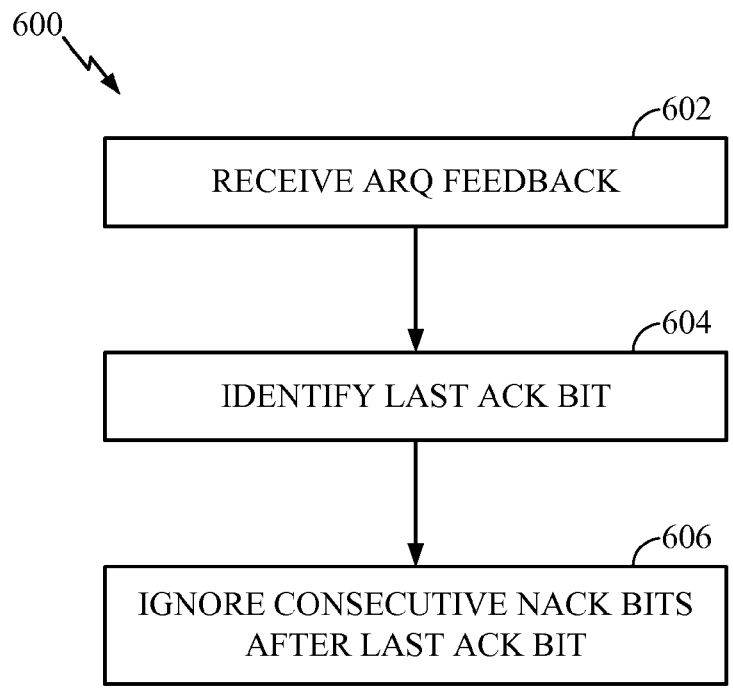
FIG. 6 illustrates example operations performed by an ARQ transmitter, in accordance with certain embodiments as set forth herein.

FIG. 6 illustrates an example sequence of operations performed by an ARQ transmitter, according to certain embodiments of the present application. At 602, the ARQ transmitter receives an ARQ feedback with respect to blocks sent. At 604, the ARQ transmitter identifies the last ACK bit in the ARQ feedback message. At 606, the ARQ transmitter ignores consecutive NACK bits after the last ACK bit. By ignoring the consecutive NACK bits after the last ACK bit, according to certain embodiments, the ARQ transmitter avoids unnecessary retransmissions.

Figure 7:
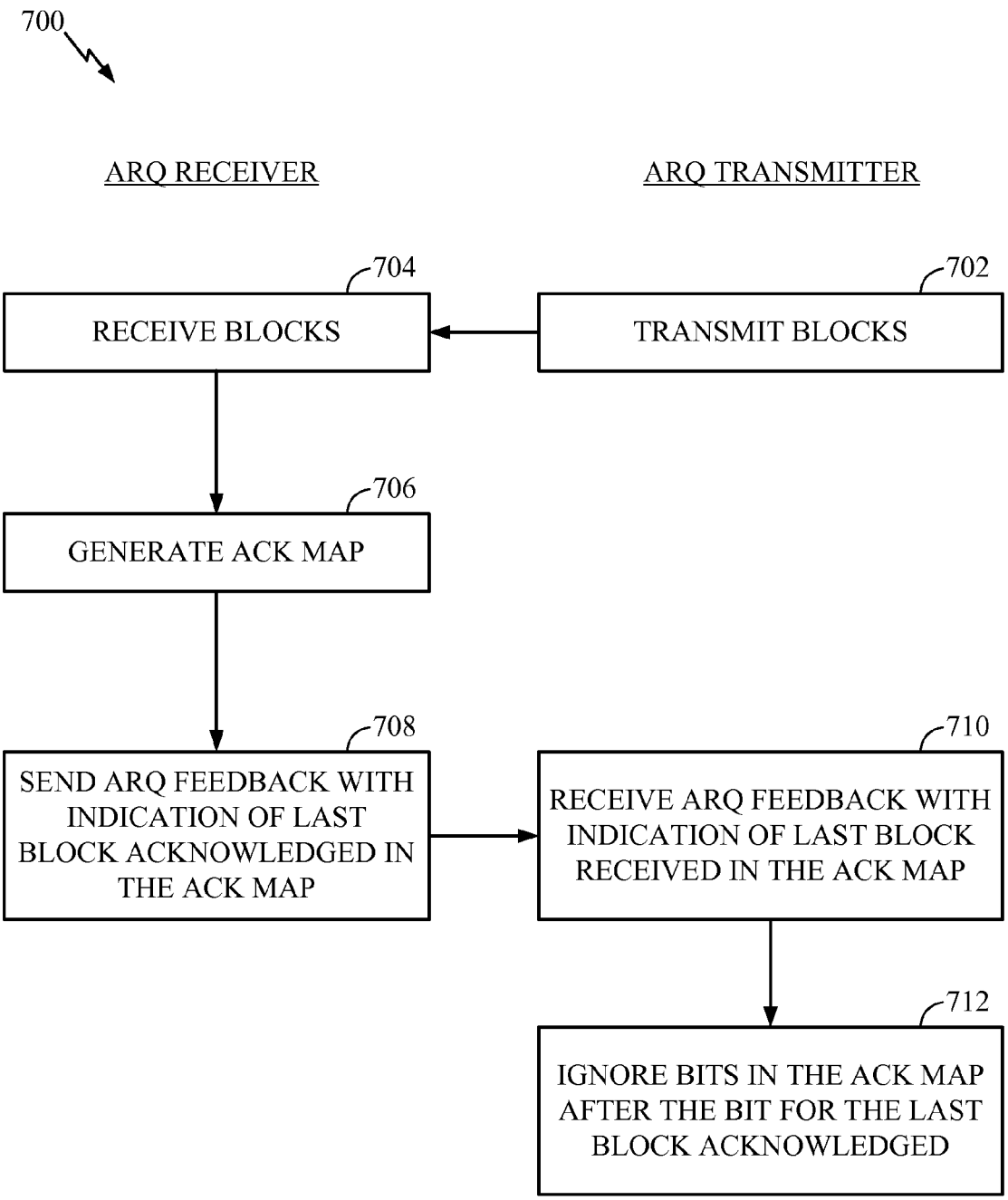
FIG. 7 illustrates an exemplary exchange of commands between an ARQ transmitter and an ARQ receiver, and example operations performed by the ARQ transmitter and the ARQ receiver, in accordance with certain embodiments as set forth herein.

FIG. 7 illustrates an example exchange of commands and sequences of operations performed by an ARQ transmitter and an ARQ receiver, according to certain embodiments of the present application. The ARQ transmitter transmits blocks, shown at 702, which are received at least in part by the ARQ receiver, shown at 704. The ARQ receiver generates a feedback message (including an ACK MAP) at 706. For example, the ARQ receiver may utilize any of the feedback message bitmaps in FIGS. 8 and 9. The ARQ receiver then sends the ARQ feedback message with an indication of the last block acknowledged in the ACK MAP, shown at 708.

The ARQ transmitter receives the ARQ feedback message with the indication of the last block acknowledged in the ACK MAP information element, shown at 710. The ARQ transmitter ignores the bits in the ACK MAP after the bit corresponding to the last block acknowledged, shown at 712. The ARQ transmitter may retransmit some of the blocks based on the ACK or NACK bits received in the valid portion of the ACK MAP.

FIG. 8 illustrates a first set of proposed bitmaps for selective ARQ feedback and cumulative with selective ARQ feedback messages, in accordance with certain embodiments of FIG. 7 and the present application. As shown in FIG. 8, the ACK MAP may include indication of the last block serial number (BSN) 802 the receiver wants to acknowledge.

FIG. 9 illustrates a second set of proposed bitmaps for selective ARQ feedback and cumulative with selective ARQ feedback messages, in accordance with certain embodiments of FIG. 7 and the present application. As shown in FIG. 9, the last four bits 902 of the last ACK MAP block 904 may indicate which bit is the last valid bit. In the example of FIG. 9, the last ACK MAP block 904 may indicate up to a maximum of twelve acknowledged blocks (e.g., twelve ACK bits), as the remaining four bits are used to indicate which bit is the last valid bit.

For certain embodiments of the present disclosure, in order to reduce the unnecessary retransmissions, the ARQ transmitter may be notified of the last acknowledged block by a block containing the serial number of the last block acknowledged, if the last bit in the last ACK MAP block is zero. If the last bit in the last ACK MAP block is one, meaning that the last block is acknowledged, the ARQ transmitter does not wait to receive another block containing the serial number of the last block acknowledged.

Figure 10:
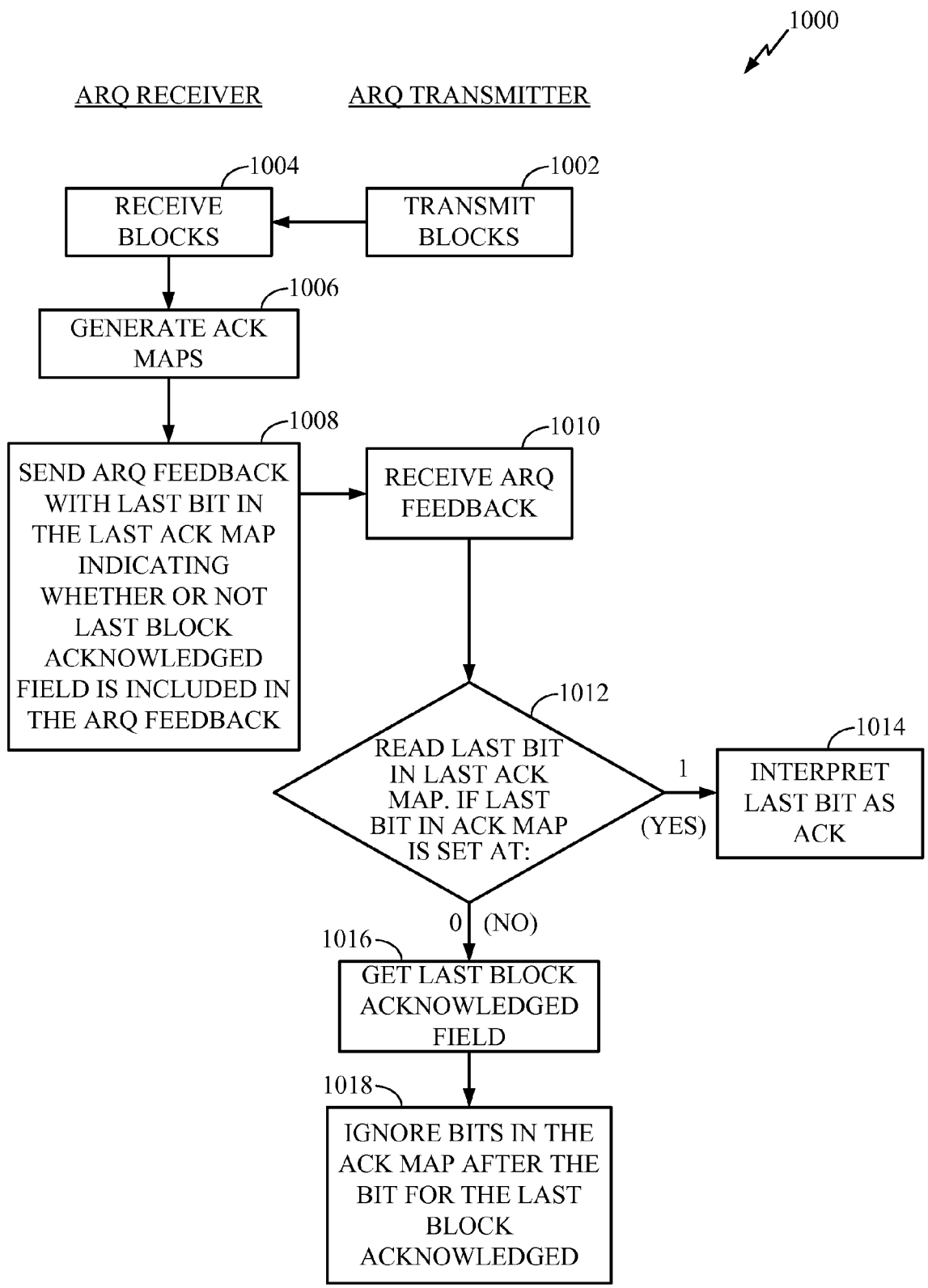
FIG. 10 illustrates an exemplary exchange of commands between an ARQ transmitter and an ARQ receiver, and example operations performed by the ARQ transmitter and the ARQ receiver, in accordance with certain embodiments as set forth herein.

FIG. 10 illustrates an example exchange of commands and sequences of operations performed by an ARQ transmitter and an ARQ receiver, according to certain embodiments of the present application. The ARQ transmitter transmits blocks, shown at 1002, which are received at least in part by the ARQ receiver, shown at 1004. The ARQ receiver generates ARQ feedback messages (ACK MAPs) at 1006. The ARQ receiver then sends the ARQ feedback message with the last bit in the last ACK MAP indicating whether or not a "last block acknowledged" field is included in the ARQ feedback message, shown at 1008.

The ARQ transmitter receives the ARQ feedback at 1010. The ARQ transmitter reads the last bit in the last ACK MAP, at 1012. If the last bit in the last ACK MAP is one, the ARQ transmitter interprets the last bit as ACK, shown at 1014. If the last bit in the last ACK Map is zero, the ARQ transmitter gets and reads the serial number of the last block acknowledged in the last block acknowledged field, shown at 1016. The ARQ transmitter then ignores the bits in the last ACK MAP message after the bit associated with the last block acknowledged.

FIGS. 11A-11D illustrate a third set of proposed bitmaps for selective ARQ feedback and cumulative with selective ARQ feedback messages, in accordance with certain embodiments of FIG. 10 and the present application. The last ACK MAP block 904 in the ARQ feedback message has a value of either zero or one for the last bit.

Figure 11A:
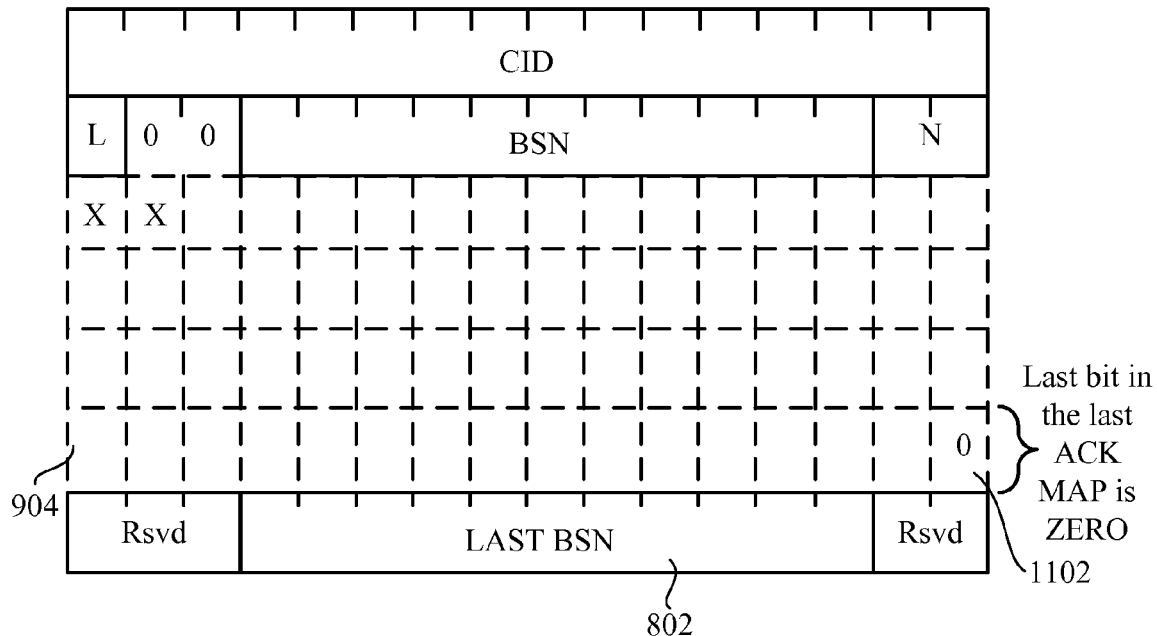
FIGS. 11A-11D illustrate a third set of proposed bitmaps for selective ARQ feedback and cumulative with selective ARQ feedback messages, in accordance with certain embodiments as set forth herein.

FIG. 11A illustrates the proposed bitmap for selective ARQ feedback when the last bit 1102 in the last ACK MAP block 904 is zero. Therefore, an additional block is received by the transmitter that includes the serial number of the last block acknowledged 802 in the last ACK MAP block.

Figure 11B:
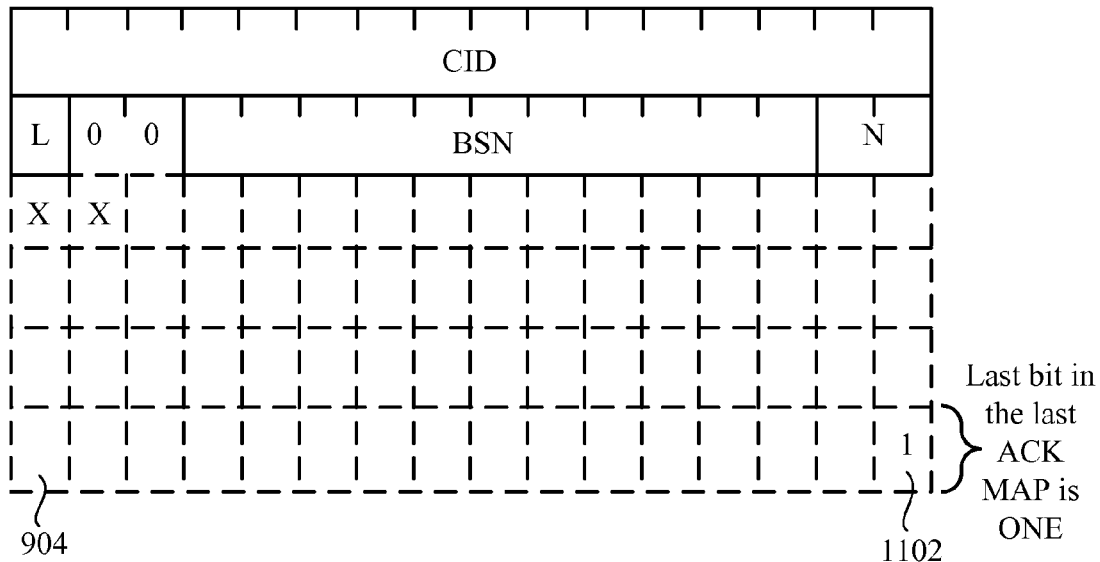

FIG. 11B illustrates the proposed bitmap for selective ARQ feedback when the last bit 1102 in the last ACK MAP block 904 is one, Therefore, the ARQ transmitter interprets this bit as an ACK for the block corresponding to the last bit 1102 in the last ACK MAP block 904.

Figure 11C:
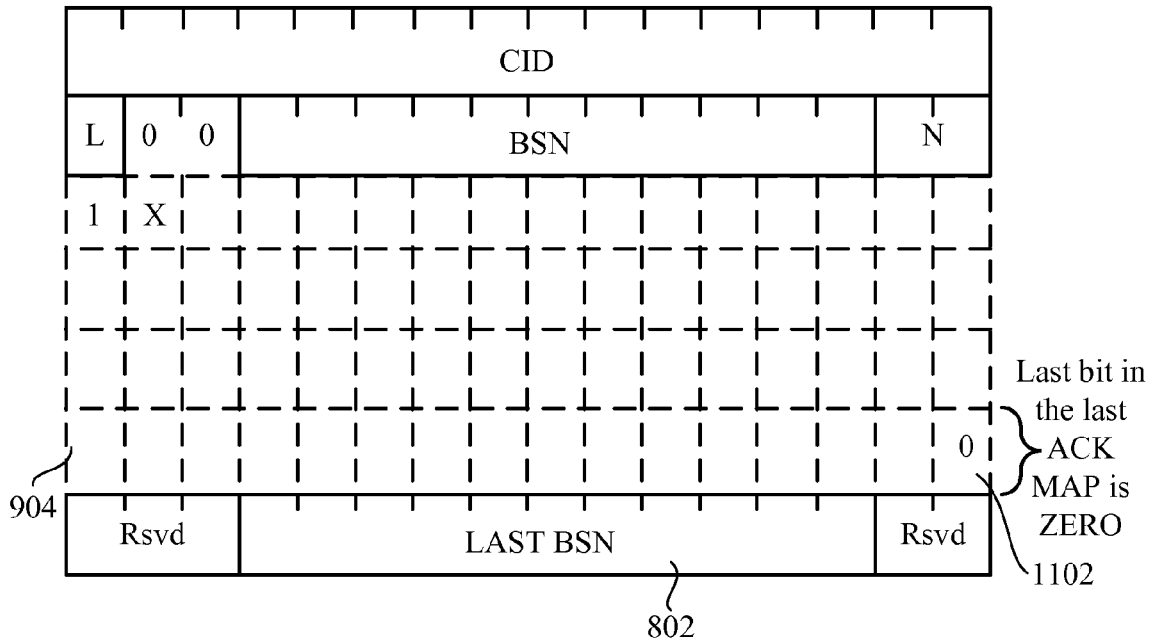

FIG. 11C illustrates the proposed bitmap for cumulative with selective ARQ feedback when the last bit 1102 in the last ACK MAP block 904 is zero. Similar to FIG. 11A, an additional block is received by the transmitter that includes the serial number of the last block acknowledged 802 in the last ACK MAP block.

Figure 11D:
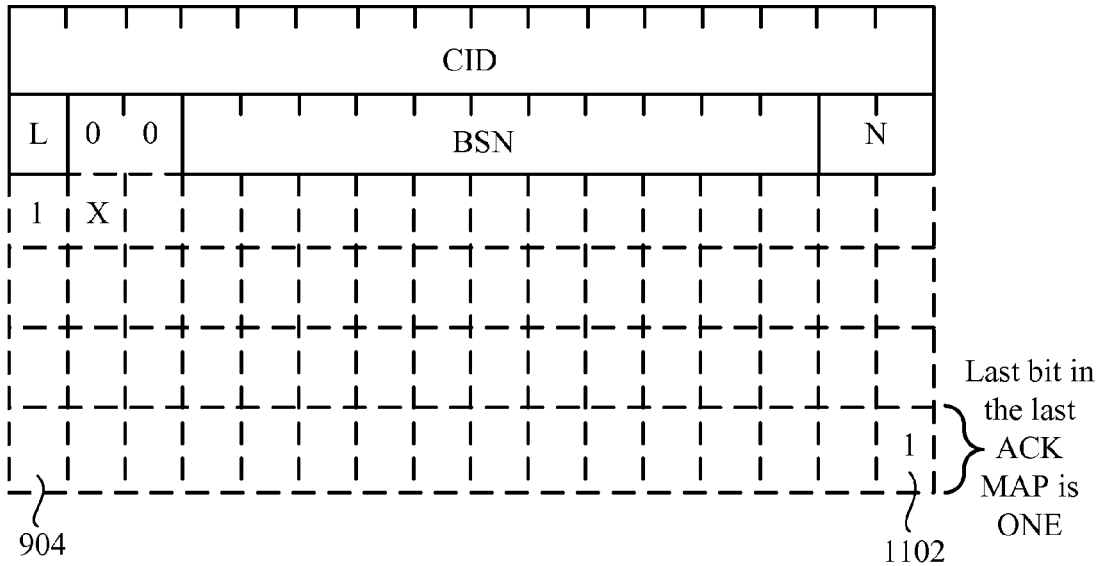

FIG. 11D illustrates the proposed bitmap for cumulative with selective ARQ feedback when the last bit 1102 in the last ACK MAP block 904 is one. Similar to FIG. 11D, ACK is indicated for the block corresponding to the last bit 1102 in the last ACK MAP block 904.

Certain embodiments of the present disclosure provided methods to notify the ARQ transmitter of the last block acknowledged in the ARQ feedback message in order to avoid unnecessary retransmissions. Information regarding the last block acknowledged may be sent to the ARQ transmitter in various forms. The present disclosure lists a few example bitmaps for selective and cumulative with selective feedback containing information about last acknowledged block. However, other bitmaps may be used without departing from the scope of the current disclosure.

Figure 6A:
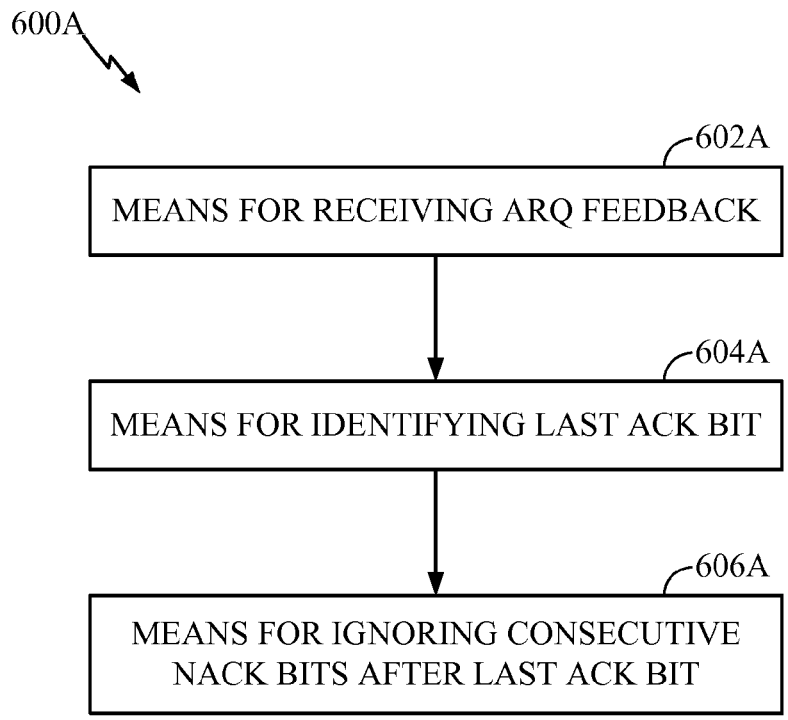
FIG. 6A illustrates example components capable of performing the operations illustrated in FIG. 6.
Figure 7A:
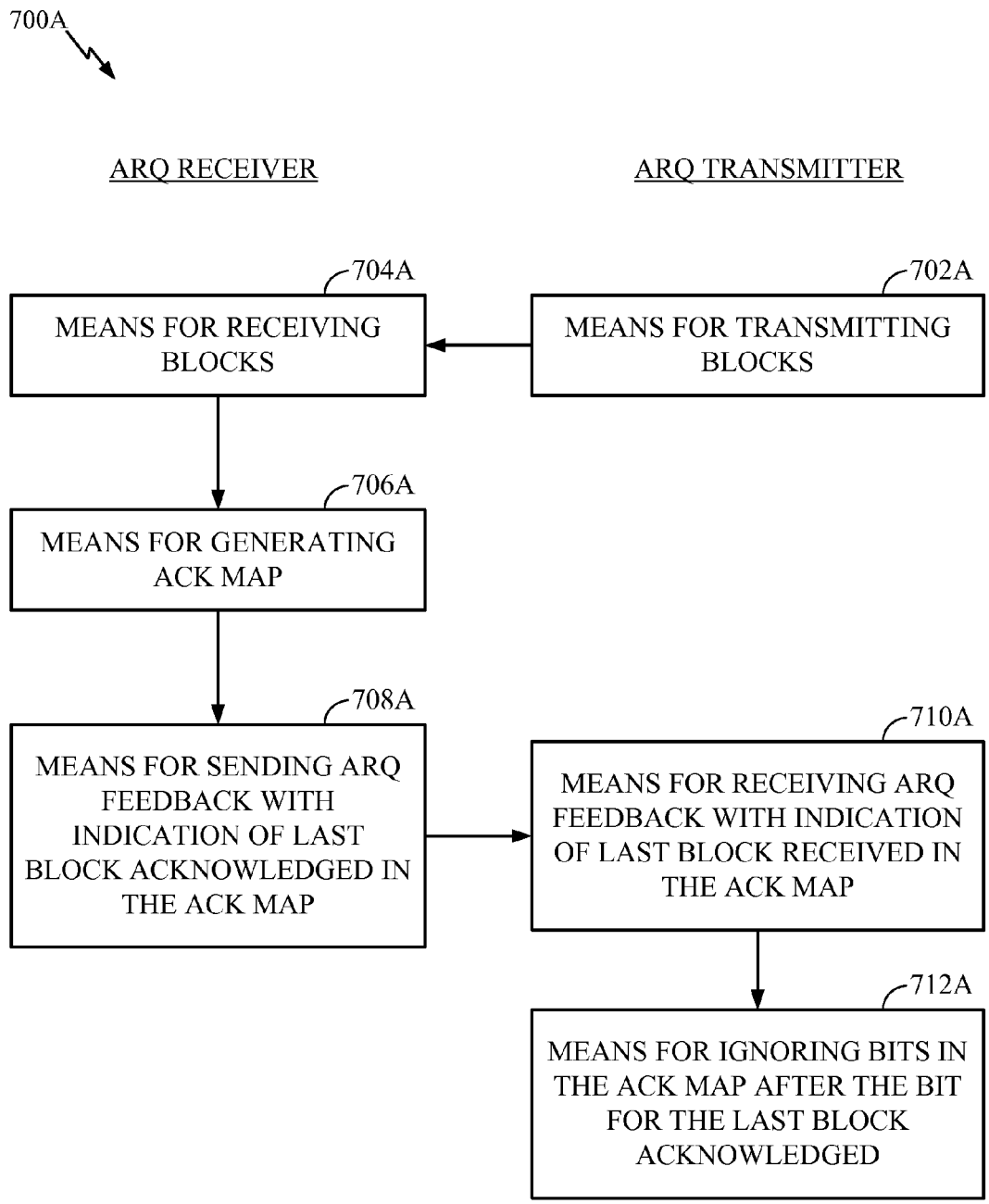
FIG. 7A illustrates example components capable of performing the operations illustrated in FIG. 7.
Figure 10A:
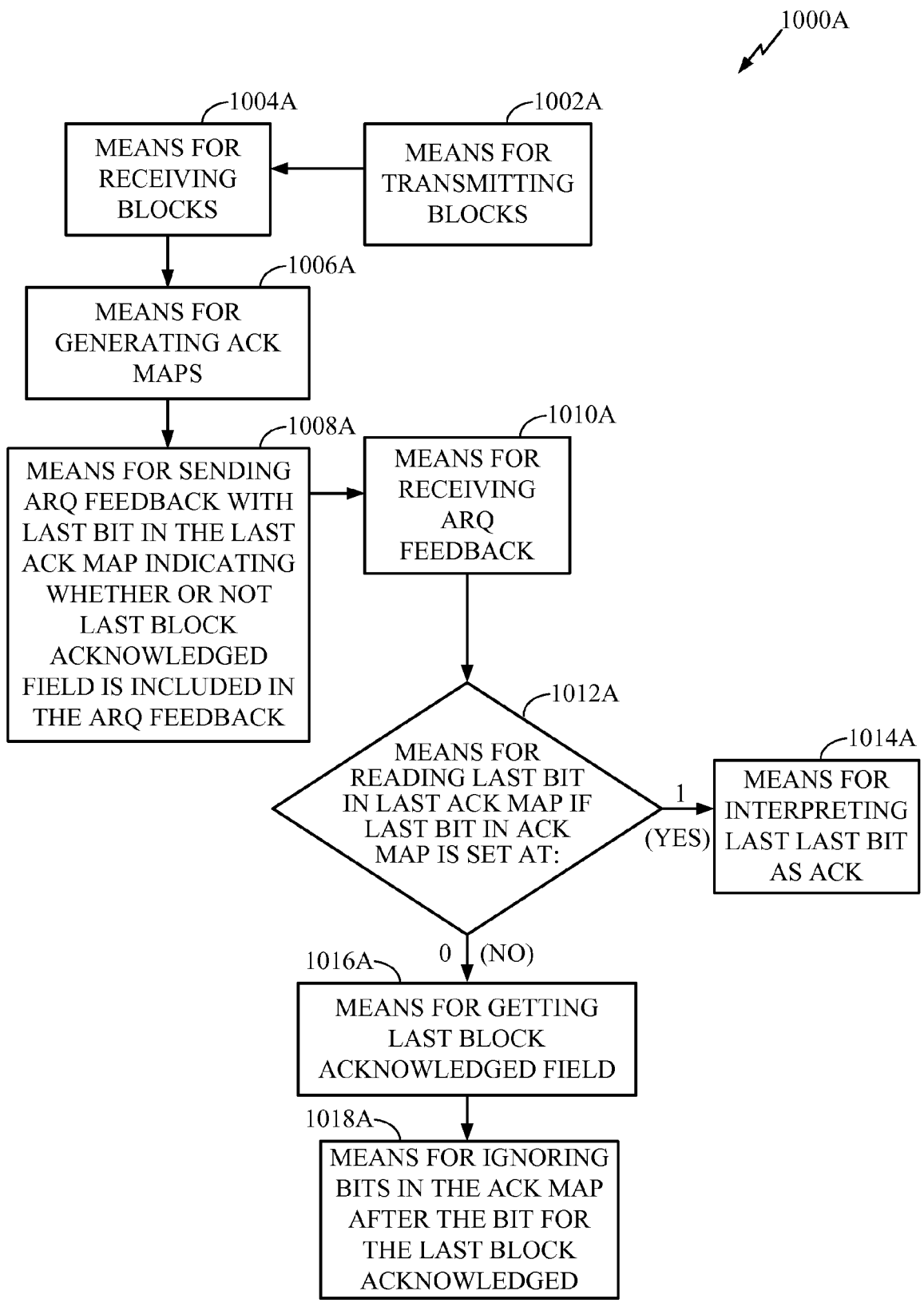
FIG. 10A illustrates example components capable of performing the operations illustrated in FIG. 10.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, operations 600, 700 and 1000 illustrated in FIGS. 6, 7 and 10 all correspond to means-plus-function blocks 600A, 700A, and 1000A illustrated in FIGS. 6A, 7A and 10A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
receiving an Automatic Repeat-Request (ARQ) feedback message including an ACK MAP comprising a plurality of bits indicating whether or not corresponding blocks of data were successfully received by a device sending the ARQ feedback message;
determining a last valid bit of the ACK MAP based on the ARQ feedback message, wherein determining the last valid bit comprises reading a sequence number of a last block acknowledged in a last block sequence number (BSN) field in the ARQ feedback message; and
ignoring one or more bits in the ARQ feedback message after the last valid bit.

2. The method of claim 1, wherein:
determining the last valid bit comprises determining a last acknowledgement (ACK) bit; and
ignoring the bits in the ARQ feedback message comprises ignoring consecutive NACK bits after the last ACK bit.

3. The method of claim 1, wherein the ARQ feedback message comprises at least one of a Selective acknowledgement (ACK) message and a Cumulative with Selective acknowledgement (ACK) message.

4. A method for wireless communications, comprising:
receiving an Automatic Repeat-Request (ARQ) feedback message including an ACK MAP comprising a plurality of bits indicating whether or not corresponding blocks of data were successfully received by a device sending the ARQ feedback message;
determining a last valid bit of the ACK MAP based on the ARQ feedback message, wherein determining the last valid bit comprises:
reading a last bit in a last acknowledgement (ACK) MAP of the ARQ feedback message;
interpreting the last bit as an ACK if the last bit is a 1; and
reading a last block acknowledged field in a block after the last ACK MAP of the ARQ feedback message if the last bit is a 0; and
ignoring one or more bits in the ARQ feedback message after the last valid bit.

5. A method for wireless communications, comprising:
receiving an Automatic Repeat-Request (ARQ) block;
generating an ARQ feedback message including an ACK MAP comprising a plurality of bits indicating whether or not corresponding blocks of data were successfully received and an indication of a last valid bit of the ACK MAP, wherein the indication of the last valid bit comprises a last block sequence number (BSN) field in an acknowledgement (ACK) MAP information element; and
transmitting the ARQ feedback message.

6. The method of claim 5, wherein the indication of the last valid bit comprises a last bit in a last acknowledgement (ACK) MAP of the ARQ feedback message.

7. A method for wireless communications, comprising:
receiving an Automatic Repeat-Request (ARQ) block;
generating an ARQ feedback message including an ACK MAP comprising a plurality of bits indicating whether or not corresponding blocks of data were successfully received and an indication of a last valid bit of the ACK MAP, wherein generating the ARQ feedback message comprises:
setting the last bit of a last acknowledgement (ACK) MAP to 1 to indicate an acknowledgement if the last valid bit corresponds to the last bit of the last ACK MAP; and
adding a last block sequence number (BSN) field to the ARQ feedback message to indicate the last valid bit if the last valid bit does not correspond to the last bit of the last ACK MAP; and
transmitting the ARQ feedback message.

8. The method of claim 7, wherein the ARQ feedback message comprises at least one of a Selective acknowledgement message and a Cumulative with Selective acknowledgement message.

9. An apparatus for wireless communications, comprising:
at least one processor configured to:
receive an Automatic Repeat-Request (ARQ) feedback message including an ACK MAP comprising a plurality of bits indicating whether or not corresponding blocks of data were successfully received by a device sending the ARQ feedback message,
determine a last valid bit of the ACK MAP based on the ARQ feedback message, wherein determining the last valid bit comprises reading a sequence number of a last block acknowledged in a last block sequence number (BSN) field in the ARQ feedback message, and
ignore one or more bits in the ARQ feedback message after the last valid bit; and
a memory coupled to the at least one processor.

10. The apparatus of claim 9, wherein:
determining the last valid bit comprises determining a last acknowledgement (ACK) bit; and
ignoring the bits in the ARQ feedback message comprises ignoring consecutive NACK bits after the last ACK bit.

11. The apparatus of claim 9, wherein the ARQ feedback message comprises at least one of a Selective acknowledgement (ACK) message and a Cumulative with Selective acknowledgement (ACK) message.

12. An apparatus for wireless communications, comprising:
at least one processor configured to:
receive an Automatic Repeat-Request (ARQ) feedback message including an ACK MAP comprising a plurality of bits indicating whether or not corresponding blocks of data were successfully received by a device sending the ARQ feedback message,
determine a last valid bit of the ACK MAP based on the ARQ feedback message, wherein determining the last valid bit comprises:
reading a last bit in a last acknowledgement (ACK) MAP of the ARQ feedback message;

interpreting the last bit as an ACK if the last bit is a 1; and reading a last block acknowledged field in a block after the last ACK MAP of the ARQ feedback message if the last bit is a 0, and ignore one or more bits in the ARQ feedback message after the last valid bit; and a memory coupled to the at least one processor.

13. An apparatus for wireless communications, comprising:

at least one processor configured to:

receive an Automatic Repeat-Request (ARQ) block, generate an ARQ feedback message including an ACK MAP comprising a plurality of bits indicating whether or not corresponding blocks of data were successfully received and an indication of a last valid bit of the ACK MAP, wherein the indication of the last valid bit comprises a last block sequence number (BSN) field in an acknowledgement (ACK) MAP information element, and transmit the ARQ feedback message, wherein the last valid bit indicates to ignore one or more bits in the ARQ feedback message after the last valid bit; and a memory coupled to the at least one processor.

14. The apparatus of claim 13, wherein the indication of the last valid bit comprises a last bit in a last acknowledgement (ACK) MAP of the ARQ feedback message.

15. The apparatus of claim 13, wherein the ARQ feedback message comprises at least one of a Selective acknowledgement message and a Cumulative with Selective acknowledgement message.

16. An apparatus for wireless communications, comprising:

at least one processor configured to:

receive an Automatic Repeat-Request (ARQ) block, generate an ARQ feedback message including an ACK MAP comprising a plurality of bits indicating whether or not corresponding blocks of data were successfully received and an indication of a last valid bit of the ACK MAP, wherein generating the ARQ feedback message comprises:

setting the last bit of a last acknowledgement (ACK) MAP to 1 to indicate an acknowledgement if the last valid bit corresponds to the last bit of the last ACK MAP; and adding a last block sequence number (BSN) field to the ARQ feedback message to indicate the last valid bit if the last valid bit does not correspond to the last bit of the last ACK MAP, and transmit the ARQ feedback message, wherein the last valid bit indicates to ignore one or more bits in the ARQ feedback message after the last valid bit; and a memory coupled to the at least one processor.

17. An apparatus for wireless communications, comprising:

means for receiving an Automatic Repeat-Request (ARQ) feedback message including an ACK MAP comprising a plurality of bits indicating whether or not corresponding blocks of data were successfully received by a device sending the ARQ feedback message;

means for determining a last valid bit of the ACK MAP based on the ARQ feedback message, wherein determining the last valid bit comprises reading a sequence number of a last block acknowledged in a last block sequence number (BSN) field in the ARQ feedback message; and means for ignoring one or more bits in the ARQ feedback message after the last valid bit.

18. The apparatus of claim 17, wherein:

means for determining the last valid bit comprises determining a last acknowledgement (ACK) bit; and means for ignoring the bits in the ARQ feedback message comprises ignoring consecutive NACK bits after the last ACK bit.

19. The apparatus of claim 17, wherein the ARQ feedback message comprises at least one of a Selective acknowledgement (ACK) message and a Cumulative with Selective acknowledgement (ACK) message.

20. An apparatus for wireless communications, comprising:

means for receiving an Automatic Repeat-Request (ARQ) feedback message including an ACK MAP comprising a plurality of bits indicating whether or not corresponding blocks of data were successfully received by a device sending the ARQ feedback message;

means for determining a last valid bit of the ACK MAP based on the ARQ feedback message, wherein the means for determining the last valid bit comprises:

means for reading a last bit in a last acknowledgement (ACK) MAP of the ARQ feedback message means for interpreting the last bit as an ACK if the last bit is a 1; and means for reading a last valid bit field in a block after the last ACK MAP of the ARQ feedback message if the last bit is a 0; and means for ignoring one or more bits in the ARQ feedback message after the last valid bit.

21. An apparatus for wireless communications, comprising:

means for receiving an Automatic Repeat-Request (ARQ) block;

means for generating an ARQ feedback message including an ACK MAP comprising a plurality of bits indicating whether or not corresponding blocks of data were successfully received and an indication of a last valid bit of the ACK MAP, wherein the indication of the last valid bit comprises a last block sequence number (BSN) field in an acknowledgement (ACK) MAP information element; and means for transmitting the ARQ feedback message.

22. The apparatus of claim 21, wherein the indication of the last valid bit comprises a last bit in a last acknowledgement (ACK) MAP of the ARQ feedback message.

23. An apparatus for wireless communications, comprising:

means for receiving an Automatic Repeat-Request (ARQ) block;

means for generating an ARQ feedback message including an ACK MAP comprising a plurality of bits indicating whether or not corresponding blocks of data were successfully received and an indication of a last valid bit of the ACK MAP, wherein generating the ARQ feedback message comprises:

means for setting the last bit of a last acknowledgement (ACK) MAP to 1 to indicate an acknowledgement if the last valid bit corresponds to the last bit of the last ACK MAP; and means for adding a last block sequence number (BSN) field to the ARQ feedback message to indicate the last valid bit if the last valid bit does not correspond to the last bit of the last ACK MAP; and means for transmitting the ARQ feedback message.

24. The apparatus of claim 23, wherein the ARQ feedback message comprises at least one of a Selective acknowledgement message and a Cumulative with Selective acknowledgement message.

25. A computer-program storage apparatus for wireless communications, comprising a computer readable memory having instructions stored thereon, the instructions being executable by one or more processors and the instructions comprising:
 instructions for receiving an Automatic Repeat-Request (ARQ) feedback message including an ACK MAP comprising a plurality of bits indicating whether or not corresponding blocks of data were successfully received by a device sending the ARQ feedback message;
 instructions for determining a last valid bit of the ACK MAP based on the ARQ feedback message, wherein the instructions for determining the last valid bit comprise instructions for reading a sequence number of a last block acknowledged in a last block sequence number (BSN) field in the ARQ feedback message; and
 instructions for ignoring one or more bits in the ARQ feedback message after the last valid bit.

26. The computer-program storage apparatus of claim 25, wherein:
 instructions for determining the last valid bit comprises instructions for determining a last acknowledgement (ACK) bit; and
 instructions for ignoring the bits in the ARQ feedback message comprises instructions for ignoring consecutive NACK bits after the last ACK bit.

27. The computer-program storage apparatus of claim 25, wherein the ARQ feedback message comprises at least one of a Selective acknowledgement (ACK) message and a Cumulative with Selective acknowledgement (ACK) message.

28. A computer-program storage apparatus for wireless communications, comprising a computer readable memory having instructions stored thereon, the instructions being executable by one or more processors and the instructions comprising:
 instructions for receiving an Automatic Repeat-Request (ARQ) feedback message including an ACK MAP comprising a plurality of bits indicating whether or not corresponding blocks of data were successfully received by a device sending the ARQ feedback message;
 instructions for determining a last valid bit of the ACK MAP based on the ARQ feedback message, wherein the instructions for determining the last valid bit comprise:
  instructions for reading a last bit in a last acknowledgement (ACK) MAP of the ARQ feedback message;
  instructions for interpreting the last bit as an ACK if the last bit is a 1; and
  instructions for reading a last block acknowledged field in a block after the last ACK MAP of the ARQ feedback message if the last bit is a 0.

29. A computer-program storage apparatus for wireless communications, comprising a computer readable memory having instructions stored thereon, the instructions being executable by one or more processors and the instructions comprising:
 instructions for receiving an Automatic Repeat-Request (ARQ) block;
 instructions for generating an ARQ feedback message including an ACK MAP comprising a plurality of bits indicating whether or not corresponding blocks of data were successfully received and an indication of a last valid bit of the ACK MAP, wherein the indication of the last valid bit comprises a last block sequence number (BSN) field in an acknowledgement (ACK) MAP information element; and
 instructions for transmitting the ARQ feedback message.

30. The computer-program storage apparatus of claim 29, wherein the indication of the last valid bit comprises a last bit in a last acknowledgement (ACK) MAP of the ARQ feedback message.

31. A computer-program storage apparatus for wireless communications, comprising a computer readable memory having instructions stored thereon, the instructions being executable by one or more processors and the instructions comprising:
 instructions for receiving an Automatic Repeat-Request (ARQ) block;
 instructions for generating an ARQ feedback message including an ACK MAP comprising a plurality of bits indicating whether or not corresponding blocks of data were successfully received and an indication of a last valid bit of the ACK MAP, wherein the instructions for generating the ARQ feedback message comprise:
  instructions for setting the last bit of a last acknowledgement (ACK) MAP to 1 to indicate an acknowledgement if the last valid bit corresponds to the last bit of the last ACK MAP; and
  instructions for adding a last block sequence number (BSN) field to the ARQ feedback message to indicate the last valid bit if the last block acknowledged does not correspond to the last bit of the last ACK MAP; and
 instructions for transmitting the ARQ feedback message.

32. The computer-program storage apparatus of claim 31, wherein the ARQ feedback message comprises at least one of a Selective acknowledgement message and a Cumulative with Selective acknowledgement message.

* * * * *